(12) United States Patent
Singh et al.

(10) Patent No.: US 10,091,699 B2
(45) Date of Patent: Oct. 2, 2018

(54) HANDOVER DECISIONS BASED ON ABSOLUTE CHANNEL QUALITY OF SERVING CELL

(71) Applicant: QUALCOMM Incorporated, San Diego, CA (US)

(72) Inventors: Damanjit Singh, San Diego, CA (US); Rajat Prakash, San Diego, CA (US); Yeliz Tokgoz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 180 days.

(21) Appl. No.: 14/027,057

(22) Filed: Sep. 13, 2013

(65) Prior Publication Data

US 2014/0228025 A1 Aug. 14, 2014

Related U.S. Application Data

(60) Provisional application No. 61/764,470, filed on Feb. 13, 2013.

(51) Int. Cl.
*H04W 36/00* (2009.01)
*H04W 36/30* (2009.01)
*H04W 36/08* (2009.01)

(52) U.S. Cl.
CPC ........ *H04W 36/30* (2013.01); *H04W 36/0083* (2013.01); *H04W 36/0094* (2013.01); *H04W 36/08* (2013.01)

(58) Field of Classification Search
CPC ..... H04W 36/06; H04W 36/08; H04W 36/10; H04W 36/16; H04W 36/20; H04W 36/24; H04W 36/26; H04W 36/30; H04W 36/34; H04W 36/36; H04W 60/04
USPC ........................................................ 455/436
See application file for complete search history.

(56) References Cited

U.S. PATENT DOCUMENTS 8,059,605 B2 11/2011 Yeou et al.
8,467,791 B2 * 6/2013 Qin ................... H04W 36/0038
455/433
8,868,067 B2 * 10/2014 Chou ................... H04B 7/0469
370/331

(Continued)

FOREIGN PATENT DOCUMENTS

EP 2453694 A1 5/2012
JP 2001036558 A 2/2001

(Continued)

OTHER PUBLICATIONS

International Search Report and Written Opinion—PCT/US2014/015896—ISA/EPO—dated Jul. 3, 2014.

*Primary Examiner* — Amancio Gonzalez
(74) *Attorney, Agent, or Firm* — Arent Fox LLP

(57) ABSTRACT

Techniques are described for handover decisions based on an absolute channel quality of a serving cell. For example, there is provided a method that involves generating a set of handover parameters based on a report of serving cell signal quality to avoid ping-ponging effects of an access terminal between a serving cell and another cell. A network entity receives a report regarding a serving cell signal quality from a reporting entity. A set of parameters is defined for a network event and sent to an access terminal, where the set of parameters is based at least in part on the received report. The set of parameters for the network event is sent to the access terminal.

13 Claims, 11 Drawing Sheets

(56) References Cited

U.S. PATENT DOCUMENTS

| | | |
|---|---|---|
| 9,107,136 B2 * | 8/2015 | Whinnett .............. H04W 36/30 |
| 9,363,717 B2 * | 6/2016 | Xuan ................ H04W 36/0088 |
| 2011/0028144 A1 | 2/2011 | Catovic et al. |
| 2011/0211560 A1 | 9/2011 | Yamamoto et al. |
| 2011/0263260 A1 * | 10/2011 | Yavuz et al. .................. 455/437 |
| 2012/0147856 A1 | 6/2012 | Kazmi et al. |
| 2012/0157101 A1 | 6/2012 | Uemura et al. |
| 2012/0202498 A1 | 8/2012 | Sachs et al. |
| 2013/0021929 A1 | 1/2013 | Kim |

FOREIGN PATENT DOCUMENTS

| | | |
|---|---|---|
| JP | 2011019074 A | 1/2011 |
| WO | 2009053710 A1 | 4/2009 |
| WO | 2011050338 A1 | 4/2011 |
| WO | 2011096692 A2 | 8/2011 |
| WO | 2012022965 A2 | 2/2012 |
| WO | 2012034583 A1 | 3/2012 |
| WO | 2012090357 A1 | 7/2012 |
| WO | 2012124991 A2 | 9/2012 |

* cited by examiner

HANDOVER DECISIONS BASED ON ABSOLUTE CHANNEL QUALITY OF SERVING CELL

CLAIM OF PRIORITY UNDER 35 U.S.C. § 119

The present application for patent claims priority to Provisional Application No. 61/764,470, entitled "HANDOVER DECISIONS BASED ON ABSOLUTE CHANNEL QUALITY OF SERVING CELL", filed Feb. 13, 2013, and is assigned to the assignee hereof, and is expressly incorporated in its entirety by reference herein.

BACKGROUND

This application is directed to wireless communications systems, and more particularly to methods and apparatuses for facilitating handovers in wireless communications systems.

A wireless communication network may be deployed over a defined geographical area to provide various types of services (e.g., voice, data, multimedia services, etc.) to users within that geographical area. In a typical implementation, macro access points (e.g., each of which provides service via one or more cells) are distributed throughout a macro network to provide wireless connectivity for access terminals (e.g., cell phones) that are operating within the geographical area served by the macro network. A macro network deployment is carefully planned, designed and implemented to offer good coverage over the geographical region.

As an access terminal roams a geographical area associated with a network, signal conditions for the access terminal within a given cell may deteriorate, whereby the access terminal may be better served by another cell (e.g., access point, base station) in the network. A typical example would be where a mobile subscriber currently served by a first cell moves away from the first access point towards a second cell. It may be desirable for the access terminal to reselect to another cell in idle mode or be handed-over to another cell in active mode.

To facilitate such mobility, an access terminal regularly monitors for signals (e.g., beacon/pilot signals) of nearby cells. These signals are then compared to determine whether the access terminal should remain on its current serving cell or switch to another cell. In practice, one or more parameters may be used to control how aggressively (e.g., under what signal conditions) an access terminal performs searches for other cells. In addition, one or more parameters may be used to control when (e.g., under what signal conditions) an access terminal re-selects to another cell or is handed-over to another cell.

It is desirable for an access terminal to handover from its serving cell to another cell in a timely manner as the access terminal leaves the serving cell coverage, so that the access terminal does not go into outage. In addition, it is also desirable to avoid ping-ponging effects between the serving cell and another cell (e.g., an access terminal handing over back and forth between the two cells). Timely handovers and avoiding ping-pong effects between the two cells can improve network performance by reducing call drops, improving network signaling load, and increasing access terminal battery life.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

In accordance with one or more aspects of the implementations described herein, there is provided a system and method for configuring network events. In one implementation, a network entity may receive a report regarding a serving cell signal quality from a reporting entity. The network entity may define a set of parameters for a network event, the set of parameters based at least in part on the received report and send the set of parameters for the network event to an access terminal.

In a second implementation, a network entity may define sets of parameters corresponding to a plurality of network events and send the sets of parameters corresponding to the plurality of network events to an access terminal. The network entity may receive a report regarding a serving cell signal quality from a reporting entity and receive an indication of an occurrence of a network event from the plurality of network events from the access terminal. The network entity may determine whether to initiate handover of the access terminal based at least in part on the received indication and the received report.

In a third implementation, a network entity may define a first condition based at least in part on a comparison of a non-serving cell characteristic with a serving cell characteristic. The network entity may define a second condition based at least in part on a comparison of a serving cell signal quality with a threshold signal quality value. The network entity may define a network event to trigger upon satisfaction of both the first condition and the second condition and send information regarding the network event to an access terminal.

BRIEF DESCRIPTION OF THE DRAWINGS

These and other sample aspects of the disclosure will be described in the detailed description and the appended claims that follow, and in the accompanying drawings, wherein:

DETAILED DESCRIPTION

Figure 1:
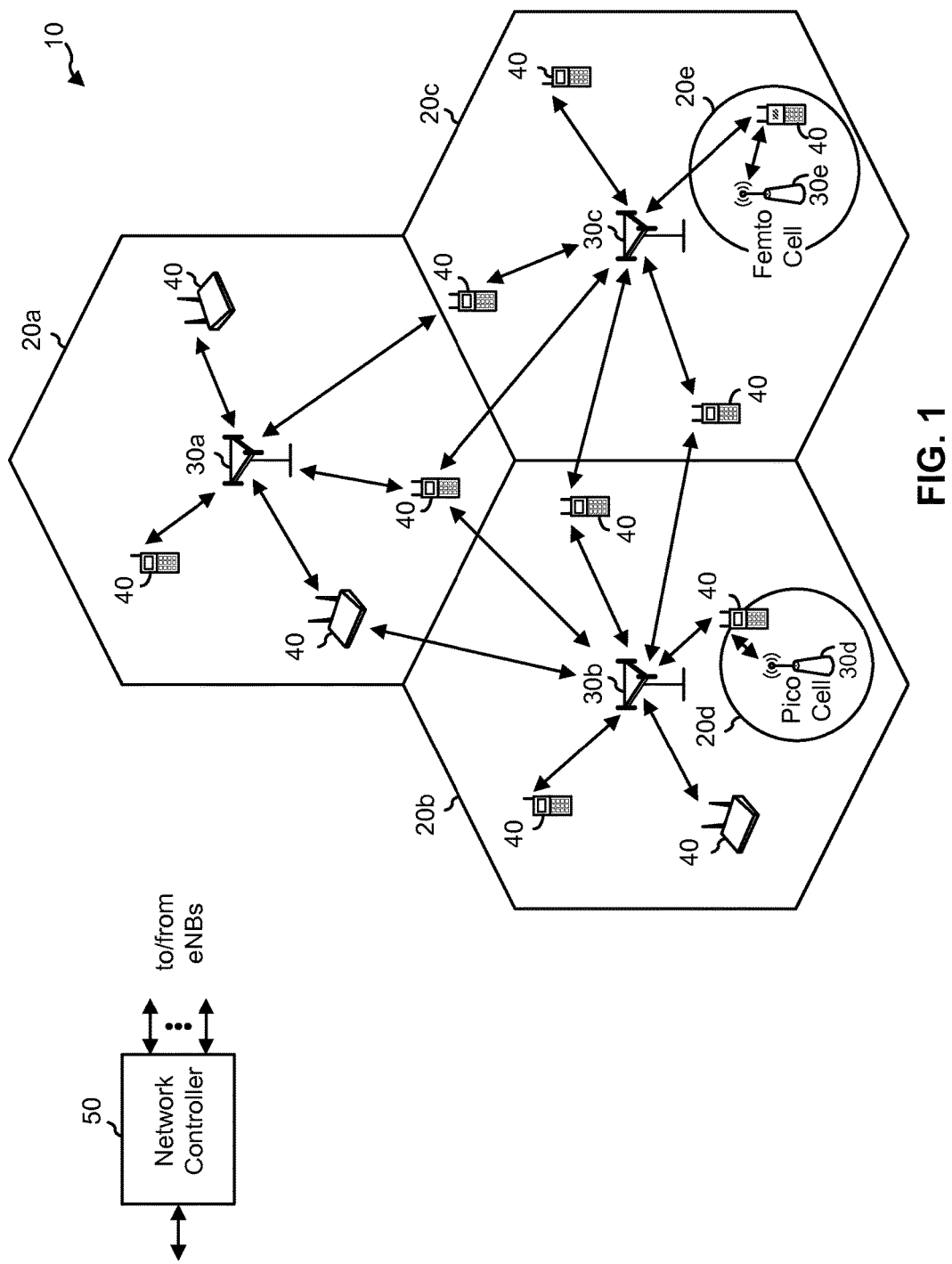
FIG. 1 is an illustration of an example wireless communication network.

Techniques for supporting radio communication are described herein. In the subject disclosure, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The subject disclosure provides a technique for improving service to mobile devices moving between base stations. As a mobile device roams a geographical area associated with a network, signal conditions for a currently serving base station may deteriorate. The mobile device may switch to being served another base station in a procedure referred to as a handover. In some situations, the mobile device should move to service by another base station in a timely manner to avoid service outage. In some other situations, the mobile device should avoid switching service too quickly which creates a ping-pong effect between base stations.

The subject disclosure provides a technique for improving service to the mobile devices moving between base stations by measuring a signal quality of the serving base station and using the signal quality as a basis for more efficient handovers.

The techniques may be used for various wireless communication networks such as wireless wide area networks (WWANs) and wireless local area networks (WLANs). The terms "network" and "system" are often used interchangeably. The WWANs may be code division multiple access (CDMA), time division multiple access (TDMA), frequency division multiple access (FDMA), orthogonal frequency-division multiple access (OFDMA), single carrier frequency division multiple access (SC-FDMA) and/or other networks. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). A WLAN may implement a radio technology such as IEEE 802.11 (Wi-Fi), Hiperlan, etc.

The techniques described herein may be used for the wireless networks and radio technologies mentioned above as well as other wireless networks and radio technologies. For clarity, certain aspects of the techniques are described below for 3GPP network and WLAN, and LTE and WLAN terminology is used in much of the description below.

FIG. 1 is an illustration of an example wireless communication network 10, which may be an LTE network or some other wireless network. Wireless network 10 may include a number of evolved Node Bs (eNBs) 30 and other network entities. An eNB may be an entity that communicates with mobile entities (e.g., user equipment (UE), access terminals, etc.) and may also be referred to as a base station, a Node B, an access point, etc. Although the eNB typically has more functionalities than a base station, the terms "eNB" and "base station" are used interchangeably herein. Each eNB 30 may provide communication coverage for a particular geographic area and may support communication for mobile entities located within the coverage area. To improve network capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area, depending on the context in which the term is used.

An eNB may provide communication coverage for a macrocell, a picocell, a femtocell, and/or other types of cell. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having association with the femtocell (e.g., UEs in a Closed Subscriber Group (CSG)). In the example shown in FIG. 1, eNBs 30a, 30b, and 30c may be macro eNBs for macrocell groups 20a, 20b, and 20c, respectively. Each of the cell groups 20a, 20b, and 20c may include a plurality (e.g., three) of cells or sectors. An eNB 30d may be a pico eNB for a picocell 20d. An eNB 30e may be a femto eNB, femtocell base station, or femto access point (FAP) for a femtocell 20e.

Wireless network 10 may also include relays (not shown in FIG. 1). A relay may be an entity that can receive a transmission of data from an upstream station (e.g., an eNB or a UE) and send a transmission of the data to a downstream station (e.g., a UE or an eNB). A relay may also be a UE that can relay transmissions for other UEs.

A network controller 50 may couple to a set of eNBs and may provide coordination and control for these eNBs. Network controller 50 may be a single network entity or a collection of network entities. Network controller 50 may communicate with the eNBs via a backhaul. The eNBs may also communicate with one another, e.g., directly or indirectly via a wireless or wireline backhaul.

UEs 40 may be dispersed throughout wireless network 10, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may be able to communicate with eNBs, relays, etc. A UE may also be able to communicate peer-to-peer (P2P) with other UEs.

Wireless network 10 may support operation on a single carrier or multiple carriers for each of the downlink (DL) and uplink (UL). A carrier may refer to a range of frequencies used for communication and may be associated with certain characteristics. Operation on multiple carriers may also be referred to as multi-carrier operation or carrier aggregation. A UE may operate on one or more carriers for the DL (or DL carriers) and one or more carriers for the UL (or UL carriers) for communication with an eNB. The eNB may send data and control information on one or more DL carriers to the UE. The UE may send data and control information on one or more UL carriers to the eNB. In one design, the DL carriers may be paired with the UL carriers. In this design, control information to support data transmission on a given DL carrier may be sent on that DL carrier and an associated UL carrier. Similarly, control information to support data transmission on a given UL carrier may be sent on that UL carrier and an associated DL carrier. In another design, cross-carrier control may be supported. In this design, control information to support data transmission on a given DL carrier may be sent on another DL carrier (e.g., a base carrier) instead of the DL carrier.

Wireless network 10 may support carrier extension for a given carrier. For carrier extension, different system bandwidths may be supported for different UEs on a carrier. For example, the wireless network may support (i) a first system bandwidth on a DL carrier for first UEs (e.g., UEs supporting LTE Release 8 or 9 or some other release) and (ii) a second system bandwidth on the DL carrier for second UEs (e.g., UEs supporting a later LTE release). The second system bandwidth may completely or partially overlap the first system bandwidth. For example, the second system bandwidth may include the first system bandwidth and additional bandwidth at one or both ends of the first system bandwidth. The additional system bandwidth may be used to send data and possibly control information to the second UEs.

Wireless network 10 may support data transmission via single-input single-output (SISO), single-input multiple-output (SIMO), multiple-input single-output (MISO), and/or multiple-input multiple-output (MIMO). For MIMO, a transmitter (e.g., an eNB) may transmit data from multiple transmit antennas to multiple receive antennas at a receiver (e.g., a UE). MIMO may be used to improve reliability (e.g., by transmitting the same data from different antennas) and/or to improve throughput (e.g., by transmitting different data from different antennas).

Wireless network 10 may support single-user (SU) MIMO, multi-user (MU) MIMO, Coordinated Multi-Point (CoMP), etc. For SU-MIMO, a cell may transmit multiple data streams to a single UE on a given time-frequency resource with or without precoding. For MU-MIMO, a cell may transmit multiple data streams to multiple UEs (e.g., one data stream to each UE) on the same time-frequency resource with or without precoding. CoMP may include cooperative transmission and/or joint processing. For cooperative transmission, multiple cells may transmit one or more data streams to a single UE on a given time-frequency resource such that the data transmission is steered toward the intended UE and/or away from one or more interfered UEs. For joint processing, multiple cells may transmit multiple data streams to multiple UEs (e.g., one data stream to each UE) on the same time-frequency resource with or without precoding.

Wireless network 10 may support hybrid automatic retransmission (HARQ) in order to improve reliability of data transmission. For HARQ, a transmitter (e.g., an eNB) may send a transmission of a data packet (or transport block) and may send one or more additional transmissions, if needed, until the packet is decoded correctly by a receiver (e.g., a UE), or the maximum number of transmissions has been sent, or some other termination condition is encountered. The transmitter may thus send a variable number of transmissions of the packet.

Wireless network 10 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

Wireless network 10 may utilize frequency division duplex (FDD) or time division duplex (TDD). For FDD, the DL and UL may be allocated separate frequency channels, and DL transmissions and UL transmissions may be sent concurrently on the two frequency channels. For TDD, the DL and UL may share the same frequency channel, and DL and UL transmissions may be sent on the same frequency channel in different time periods.

Figure 2:
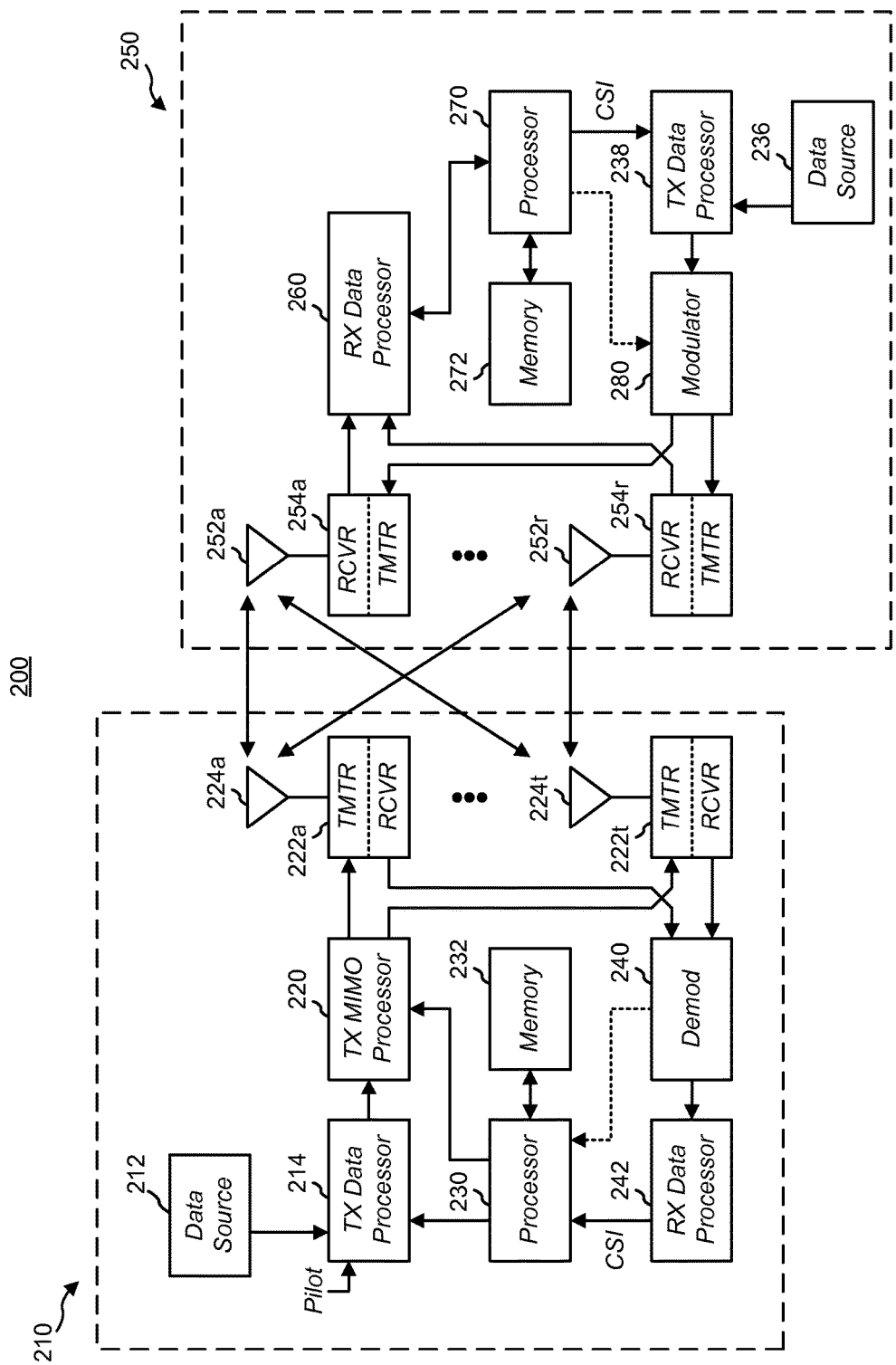
FIG. 2 is a block diagram illustrating an example of communication system components.

FIG. 2 illustrates a system 200 including a transmitter system 210 (also known as the access point, base station, or eNB) and a receiver system 250 (also known as access terminal, mobile device, or UE) in an LTE MIMO system 200. In the present disclosure, the transmitter system 210 may correspond to a WS-enabled eNB or the like, whereas the receiver system 250 may correspond to a WS-enabled UE or the like.

At the transmitter system 210, traffic data for a number of data streams is provided from a data source 212 to a transmit (TX) data processor 214. Each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain implementations, TX MIMO processor 220 applies beam-forming weights to the symbols of the data streams and to the antenna from which the symbol is being transmitted.

Each transmitter 222 receives and processes a respective symbol stream to provide one or more analog signals, and further conditions (e.g., amplifies, filters, and up-converts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, de-interleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beam-forming weights then processes the extracted message.

As used herein, an access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macrocell, a macro node, a Home eNB (HeNB), a femtocell, a femto node, a pico node, or some other similar terminology.

Figure 3:
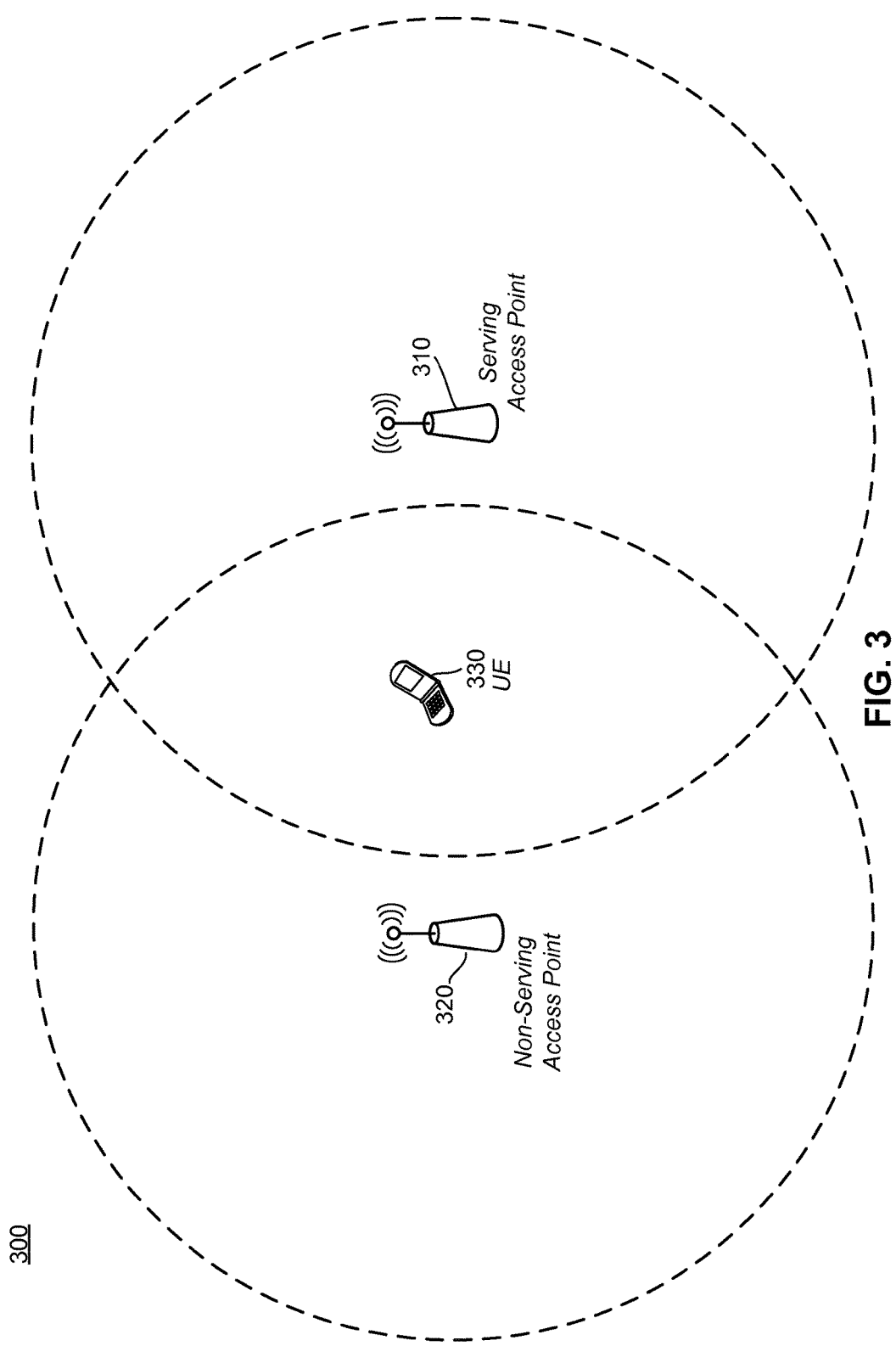
FIG. 3 illustrates an example handover scenario between two access points.

FIG. 3 illustrates an example handover scenario between two access points. For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, femtocells, macrocells, and so on, while access terminals may be referred to or implemented as user equipment (UEs), mobile stations, and so on.

Access points 310 and 320 in the system 300 may provide access to one or more services (e.g., network connectivity) for one or more wireless terminals (e.g., access terminal, UE, mobile entity, mobile device) 330 that may be installed within or that may roam throughout a coverage area of the system 300. For example, at various points in time, the access terminal 202 may connect to a serving access point 310, a non-serving access point 320 (e.g., a neighboring access point), or another access point (not shown) in the system 300. Each of the access points 310 and 320 may communicate with one or more network entities to facilitate wide area network connectivity. Such network entities may take various forms such as, for example, one or more radio and/or core network entities.

In various implementations, the network entities may be responsible for or otherwise be involved with handling: network management (e.g., via an operation, administration, management, and provisioning entity), call control, session management, mobility management, gateway functions, interworking functions, or some other suitable network functionality. In a related aspect, mobility management may relate to or involve: keeping track of the current location of access terminals through the use of tracking areas, location areas, routing areas, or some other suitable technique; controlling paging for access terminals; and providing access control for access terminals. Also, two of more of these network entities may be co-located and/or two or more of such network entities may be distributed throughout a network.

The serving access point 310 may configure a UE 330 served by the serving access point 310 with one or more triggerable events (e.g., handover events). The events may each include a set of parameters (e.g., handover parameters). For example, an offset parameter may be an amount by which a signal quality of the non-serving access point 320 is better than a signal quality of the serving access point 310. Other examples of offsets in UMTS and LTE may include hysteresis, event offset, cell individual offset, reporting range, and frequency offset. Another example of a parameter is a time-to-trigger parameter that may be satisfied when a minimum duration for certain conditions are met. In an example implementation, the UE 330 may be configured to report to the serving access point if and when the event is triggered. For example, in the case of a triggering of a handover event, the serving access point 310 may determine to whether to initiate handover of the UE 330 to the non-serving access point 320.

A handover event including a set of handover parameters may typically provide a trade-off between unnecessary or early handovers and delayed handovers. Unnecessary or early handovers may occur due to channel fading or random user mobility, where the channel conditions change only temporarily and a handover is not necessary. Early handovers may cause increased signal load at the network, packet delays, voice artifacts, and worse user experience. Delayed handovers may occur if handovers are too late. Delayed handovers may cause users to lose coverage and cause call drops as the UE continues to be served by a non-best access point. Delayed handovers may also cause greater signaling load, larger packet delays, and worse user experience.

A single set of parameters may be used for a UE 330 served by an access point 310, irrespective of the serving cell channel conditions (serving cell signal quality received by the UE). For example, a set of parameters with a larger offset may be very effective in avoiding unnecessary handovers for a UE experiencing high serving cell signal quality, but cause call drops for a UE experiencing poor serving cell signal quality. In another example, a set of parameters with a smaller offset may be very effective at avoiding call drops for a UE experiencing poor serving cell signal quality, but cause unnecessary handovers for a UE experiencing high serving cell signal quality.

Figure 4:
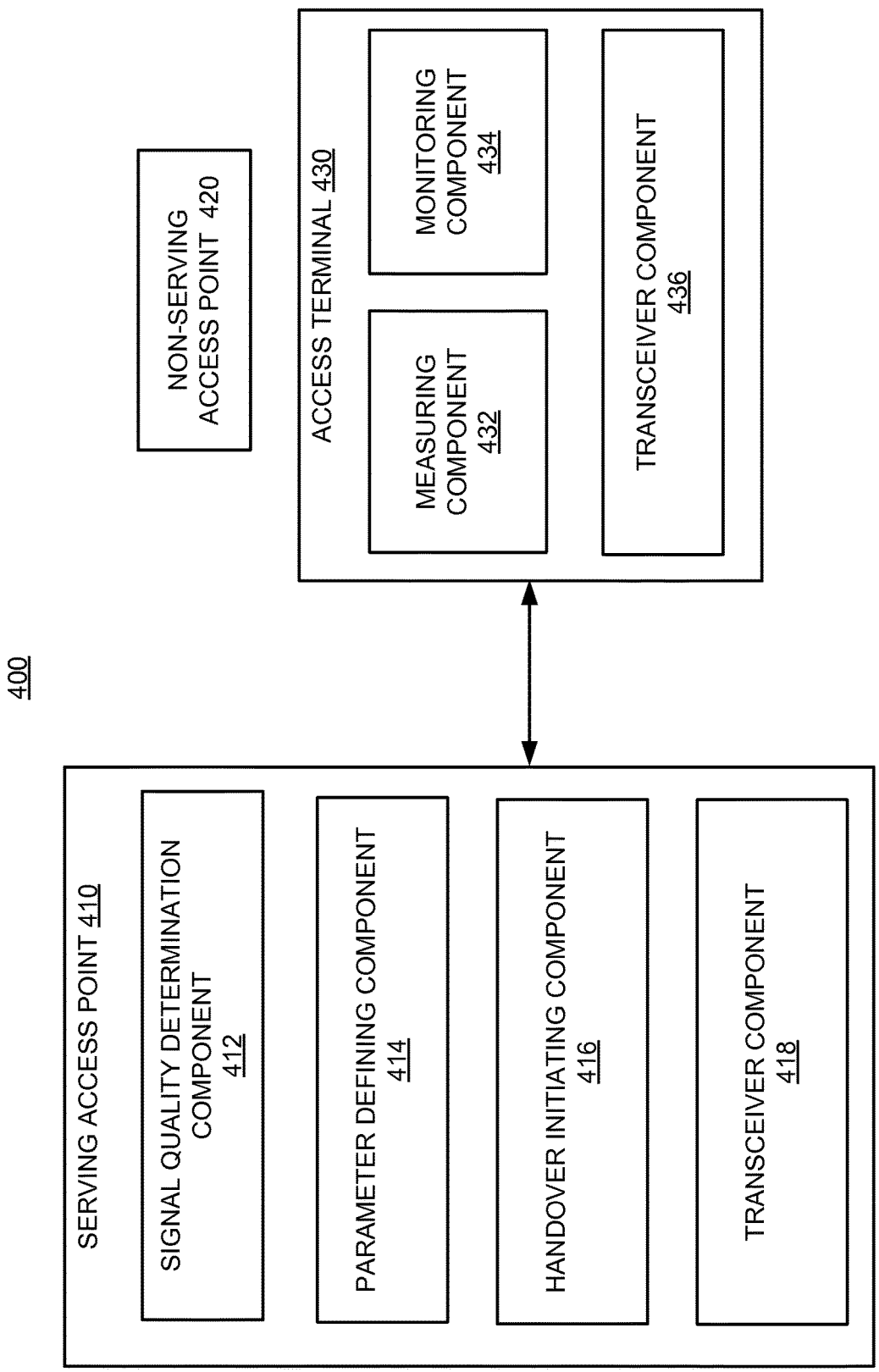
FIG. 4 is a block diagram illustrating an example of a communication system for configuring a network event based on a serving cell signal quality.

FIG. 4 is a block diagram illustrating an example of a communication system for configuring a network event based on a serving cell signal quality. In accordance with an example implementation of a communication system 400, a serving access point 410 (e.g., femtocell base station, small cell base station) provides service to an access terminal 430.

In a related implementation, the access terminal 430 may receive pilot signals from a non-serving cell such as a neighboring access point.

The serving access point 410 may include a signal quality determination component 412, which may determine the quality of signals originating from the serving access point 410 (i.e. the serving cell signal quality), as measured by the access terminal 430 or another network entity. In one implementation, the serving cell signal quality may be periodically reported by the access terminal 430 to the serving access point 410, the serving cell signal quality. In another implementation, the serving cell signal quality may be reported by the access terminal 430 to the serving access point 410, the serving cell signal quality, in response to the serving cell signal quality meeting a threshold reporting value.

The serving access point 410 may receive a report of serving cell signal quality from a reporting entity via a transceiver component 418. In an example implementation, the reporting entity may be the access terminal 430. In another implementation, the reporting entity may be another network entity such as a non-serving access point 420.

The serving access point 410 may include a parameter defining component 414. The parameter defining component 414 may define a set of parameters for a network event (e.g., handover event) based at least in part on the report of serving cell signal quality. For example, the set of parameters may include a parameter for comparing the serving cell signal quality to a non-serving cell signal quality. In a related aspect, the set of parameters may include a hysteresis parameter or a time-to-trigger parameter. In an additional related aspect, the set of parameters may include an offset parameter, a cell individual offset parameter, a reporting range parameter, or a frequency offset parameter. The serving access point 410 may send the set of parameters for the network event to the access terminal 430 via the transceiver component 418.

In an example implementation, the serving access point 410 may receive an indication of an occurrence of the network event from the access terminal 430 via the transceiver component 418. The serving access point 410 may include a handover initiating component 416. In another example implementation, the handover initiating component 418 may initiate handover of the access terminal 430 to a non-serving access point 420, in response to receiving the indication of the network event occurring.

The access terminal 430 may include a measuring component that measures a signal quality of the serving access point 410 (i.e., serving cell signal quality). In an example implementation, the access terminal 430 may report the serving cell signal quality to the serving access point 410 via a transceiver component 436. The access terminal 430 may receive the set of parameters for the network event from the serving access point 410 via the transceiver component 436. The access terminal 430 may include a monitoring component 434 which detects for an occurrence of the network event. Once an occurrence of the network event takes place, the access terminal 430 may send an indication of the occurrence to the serving access point 410 via the transceiver component 436.

Figure 5:
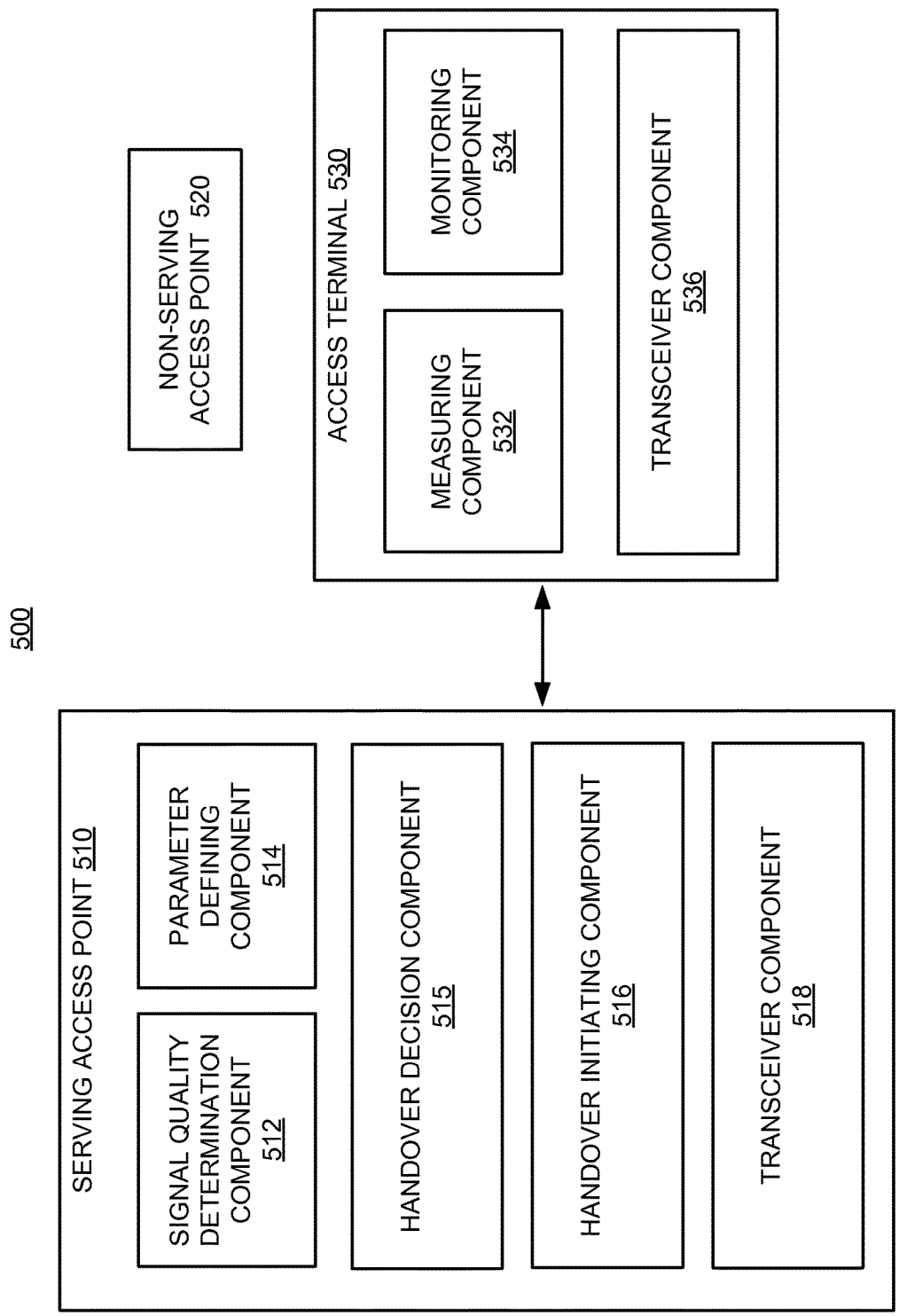
FIG. 5 is a block diagram illustrating an example of a communication system for configuring a plurality of network events.

FIG. 5 is a block diagram illustrating an example of a communication system for configuring a plurality of network events. In one example implementation of a communication system 500, a serving access point 510 (e.g., femtocell base station, small cell base station) provides service to an access terminal 530. In a related implementation, the access terminal 530 may receive pilot signals from a non-serving cell such as a neighboring access point.

The serving access point 510 may include a signal quality determination component 512, which may determine the quality of signals originating from the serving access point 510 (i.e. the serving cell signal quality), as measured by the access terminal 530 or another network entity. In one implementation, the serving cell signal quality may be periodically reported by the access terminal 530 to the serving access point 510, the serving cell signal quality. In another implementation, the serving cell signal quality may be reported by the access terminal 530 to the serving access point 510, the serving cell signal quality, in response to the serving cell signal quality meeting a threshold reporting value.

The serving access point 510 may receive a report of serving cell signal quality from a reporting entity via a transceiver component 518. In an example implementation, the reporting entity may be the access terminal 530. In another implementation, the reporting entity may be another network entity such as a non-serving access point 520.

The serving access point 510 may include a parameter defining component 514. The parameter defining component 514 may define sets of parameters corresponding to a plurality of network events (e.g., handover event). For example, each event from the plurality of network events corresponds to a difference between a serving cell characteristic (e.g., serving cell signal quality) and a non-serving cell characteristic (e.g., non-serving cell signal quality). The serving access point 510 may send the sets of parameters corresponding to the plurality of network events to the access terminal 530 via the transceiver component 518.

In an example implementation, the serving access point 510 may receive an indication of an occurrence of a network event from the plurality of network events from the access terminal 530 via the transceiver component 518. In a related aspect, the serving access point 510 may include a handover decision component 515 that determines whether to initiate handover of the access terminal 530. The handover decision may be based on the received indication of the occurrence of the network event and the received report of serving cell signal quality.

In an another example implementation, a serving access point may transmit a plurality of configurations, as a plurality of handover events, to the access terminal. The access terminal may send a handover report to the serving access point whenever any configuration from the plurality of configurations is triggered. For example, the access terminal may send a first handover report when a first handover event (corresponding to a first configuration) is triggered. In addition, the access terminal may send a second handover report when a second handover event (corresponding to a second configuration) is triggered. The serving access point may include a handover decision component. The handover decision component determines a handover decision based on the received handover report and the received serving cell signal quality. For example, the handover decision component may determine not to perform a handover if the first handover report is received from the access terminal, but the received serving cell signal quality does not correspond to the handover report (does not correspond to the first configuration). The handover decision component may then decide to perform a handover if the second handover report is received while the serving cell signal quality remains unchanged.

The serving access point 510 may include a handover initiating component 516. In another example implementation, the handover initiating component 518 may initiate handover of the access terminal 530 to a non-serving access point 520, in response to the handover decision component 515 deciding to perform handover.

The access terminal 530 may include a measuring component that measures a signal quality of the serving access point 510 (i.e., serving cell signal quality). In an example implementation, the access terminal 530 may report the serving cell signal quality to the serving access point 510 via a transceiver component 536. The access terminal 530 may receive the sets of parameters corresponding to the plurality of network events from the serving access point 510 via the transceiver component 536. The access terminal 530 may include a monitoring component 534 which detects for an occurrence of one or more of the network events based on the corresponding set of parameters. In response to detecting the occurrence, the access terminal 530 may send an indication of the occurrence to the serving access point 510 via the transceiver component 536.

Figure 6:
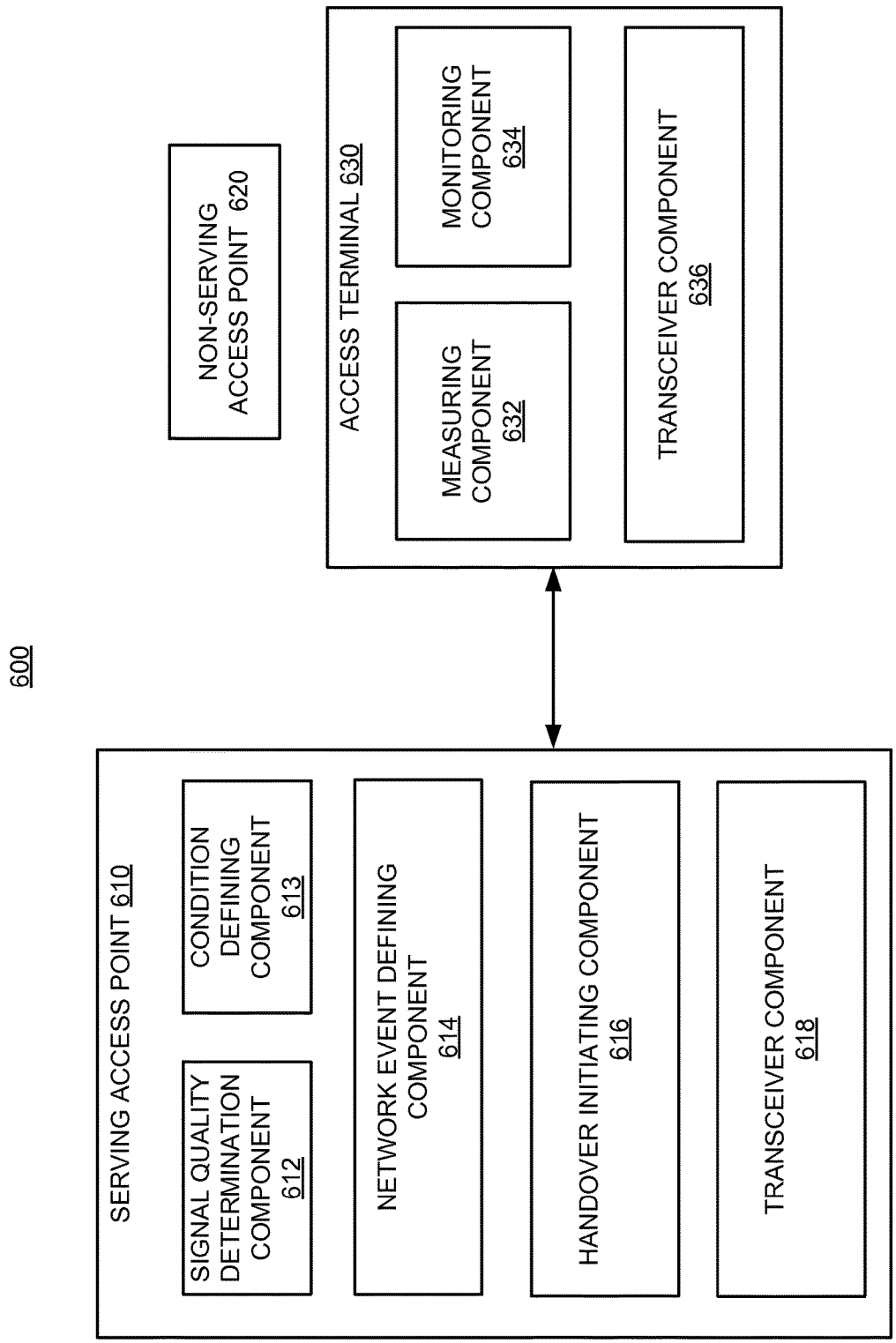
FIG. 6 is a block diagram illustrating an example of a communication system for configuring a network event based on a first condition and a second condition.

FIG. 6 is a block diagram illustrating an example of a communication system 600 for configuring a network event based on a first condition and a second condition. In one implementation, the serving access point 610 may include a condition defining component 613. The condition defining component 613 may define a first condition based on a comparison of a non-serving cell characteristic (e.g., a non-serving cell signal quality) with a serving cell characteristic (e.g., a serving cell signal quality). The condition defining component 613 may define a second condition based on a comparison of a serving cell signal quality with a threshold quality value.

The serving access point 610 may include a signal quality determination component 612, which may determine the quality of signals originating from the serving access point 610 (i.e. the serving cell signal quality), as measured by the access terminal 630 or another network entity. The serving access point 610 may receive a report of serving cell signal quality from a reporting entity via a transceiver component 618. In an example implementation, the reporting entity may be the access terminal 630. In another implementation, the reporting entity may be another network entity such as a non-serving access point 620.

The serving access point 610 may include a network event defining component 614. The network event defining component 614 may define a network even to trigger upon satisfaction of both the first condition and the second condition. In an optional implementation, the serving access point 620 may set a time duration. In a related aspect, the network event is defined to occur upon satisfaction of the first condition and the second condition for the set time duration.

The serving access point 610 may send information regarding the network event to the access terminal 630 via the transceiver component 618. In an example implementation, the serving access point 610 may receive an indication of an occurrence of the network event from the access terminal 630 via the transceiver component 618. The serving access point 610 may include a handover initiating component 616. In another example implementation, the handover initiating component 618 may initiate handover of the access terminal 630 to a non-serving access point 620, in response to receiving the indication of the network event occurring.

The access terminal 630 may include a measuring component that measures a signal quality of the serving access point 610 (i.e., serving cell signal quality). In an example implementation, the access terminal 630 may report the serving cell signal quality to the serving access point 610 via a transceiver component 636. The access terminal 630 may receive the information regarding the network event, which occurs upon satisfaction of both the first event and the second event, from the serving access point 610 via the transceiver component 636. The access terminal 630 may include a monitoring component 634 which detects for an occurrence of the network event based on the received information regarding the network event. Once an occurrence of the network event takes place, the access terminal 630 may send an indication of the occurrence to the serving access point 610 via the transceiver component 636.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 7:
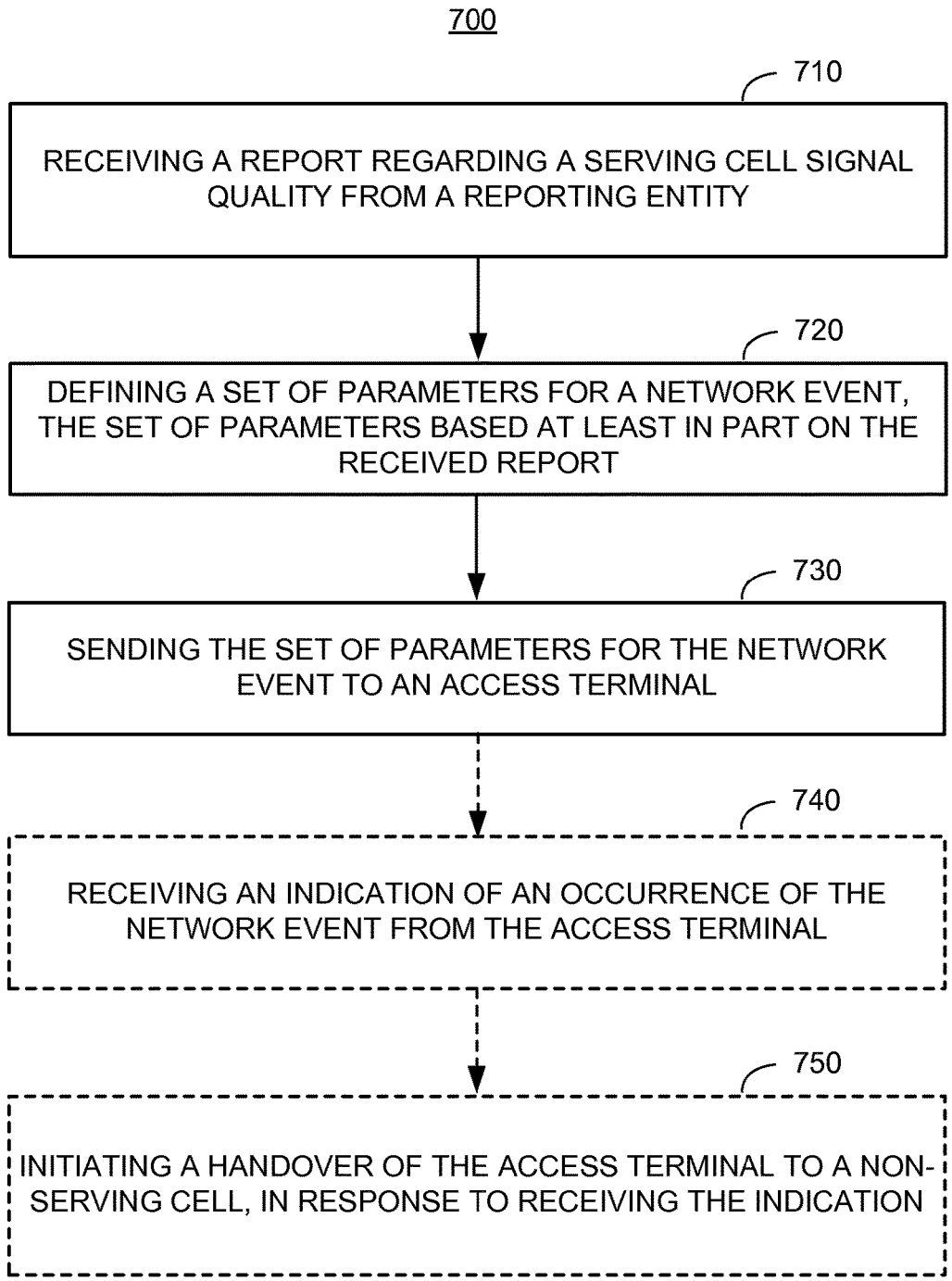
FIG. 7 illustrates an example of a methodology for configuring network events.

In accordance with one or more aspects of the implementations described herein, with reference to FIG. 7, there is shown a methodology 700 for configuring network events. The method 700, operable by a network entity or component(s) thereof, may involve, at 710 receiving a report regarding a serving cell signal quality from a reporting entity. In an example implementation, the network entity may be a femtocell base station acting as the serving access point 410, as shown in FIG. 4. In a related aspect, the receiving of the report may include periodically receiving at least one measurement of the serving cell signal quality from at least one access terminal 430 or at least one other network entity such as a non-serving access point 420. The signal quality determination component 412 of the serving access point 410 may determine the serving cell signal quality from the report, as shown in FIG. 4. In another related aspect, the receiving of the report may occur in response to a measurement of the serving cell signal quality meeting a threshold reporting value.

The method 700 may involve, at 720, defining a set of parameters for a network event, the set of parameters based at least in part on the received report. For example, the parameters may be defined by the parameter defining component 414 of the serving access point 410, as shown in FIG. 4. In a related aspect, the set of parameters may include hysteresis parameter or a time-to-trigger parameter. In another related aspect, the set of parameters may include at least one of an event offset parameter, a cell individual offset parameter, a reporting range parameter, or a frequency offset parameter. In yet another related aspect, the set of parameters may include a parameter for comparing of the serving cell signal quality with a non-serving cell signal quality.

The method 700 may involve, at 730, sending the set of parameters for the network event to an access terminal. For example, the set of parameters may be provided from the data source 212 to the TX data processor 214 to be transmitted over antennas 224, as shown in FIG. 2.

FIG. 7 shows further optional operations or aspects of the method 700. If the method 700 includes at least one optional block (shown with dashed lines), then the method 700 may terminate after the at least one block, without necessarily having to include any subsequent downstream block(s) that may be illustrated. It is further noted that numbers of the blocks do not imply a particular order in which the blocks may be performed according to the method 700. The same holds for any optional/dashed blocks shown in FIG. 8, 9, or 11.

The method 700 may optionally involve, at 740, receiving an indication of an occurrence of the network event from the access terminal. For example, the indication from the access terminal 250 may be received by the antennas 224, conditioned by the receivers 222, demodulated by the demodulator 240, and processed by the RX data processor 242, as shown in FIG. 2.

The method 700 may optionally involve, at 750, initiating a handover of the access terminal to a non-serving cell, in response to receiving the indication. For example, the handover initiating component 416 of the serving access point 410 may initiate handover of the access terminal 430 to the non-serving access point 420, as shown in FIG. 4.

Figure 8:
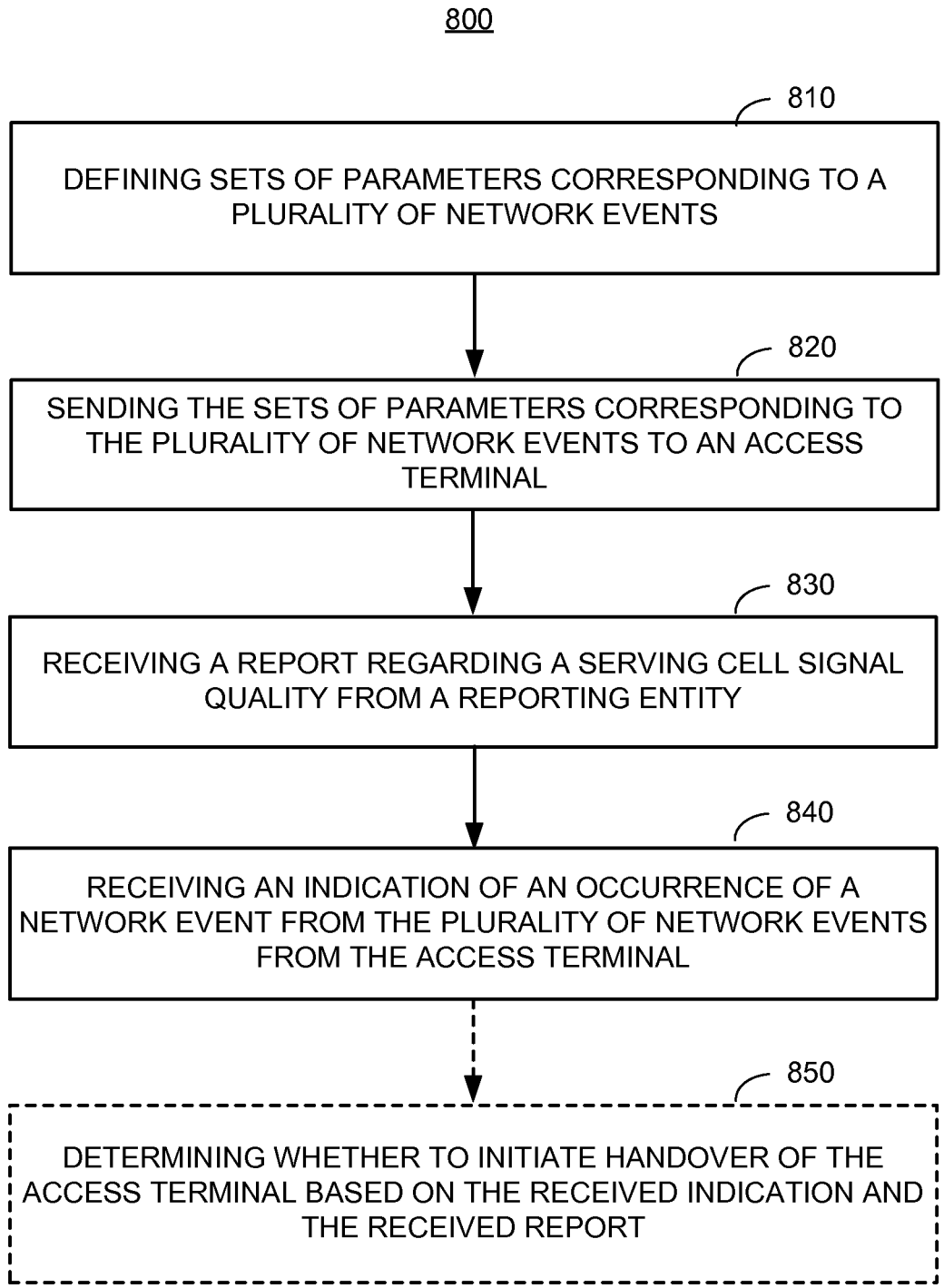
FIG. 8 illustrates a second example of a methodology for configuring network events.

In accordance with one or more aspects of the implementations described herein, with reference to FIG. 8, there is shown a second methodology 800 for configuring network events. The method 800, operable by a network entity or the like or component(s) thereof, may involve, at 810, defining sets of parameters corresponding to a plurality of network events. In an example implementation, the network entity may be a femtocell base station as the serving access point 510, as shown in FIG. 5. In a related aspect, the parameter defining component 514 of the serving access point 510 may define the sets of parameters. For example, each set of parameters may include hysteresis parameter or a time-to-trigger parameter. In another example, each set of parameters may include at least one of an event offset parameter, a cell individual offset parameter, a reporting range parameter, or a frequency offset parameter. In yet another example, each set of parameters may include a parameter for comparing of the serving cell signal quality with a non-serving cell signal quality.

The method 800 may involve, at 820, sending the sets of parameters corresponding to the plurality of network events to an access terminal. For example, the transceiver component of the serving access point 510 may send the sets of parameters to the access terminal 530, as shown in FIG. 5.

The method 800 may involve, at 830, receiving a report regarding a serving cell signal quality from a reporting entity. In an example implementation, the signal quality determination component 512 of the serving access point 510 may periodically receive at least one measurement of the serving cell signal quality from the access terminal 530 or at least one other network entity such as the non-serving access point 520, as shown in FIG. 5. In another example implementation, the signal quality determination component 512 of the serving access point 510 may receive the report may in response to a measurement of the serving cell signal quality meeting a threshold reporting value.

The method 800 may involve, at 840, receiving an indication of an occurrence of a network event from the plurality of network events from the access terminal. For example, the transceiver component 518 of the serving access point 510 may receive the indication from the access terminal 530, as shown in FIG. 5.

The method 800 may optionally involve, at 850, determining whether to initiate handover of the access terminal based on the received indication and the received report. For example, the handover initiating component 516 of the serving access point 510 may determine whether to initiate the handover, as shown in FIG. 5.

Figure 9:
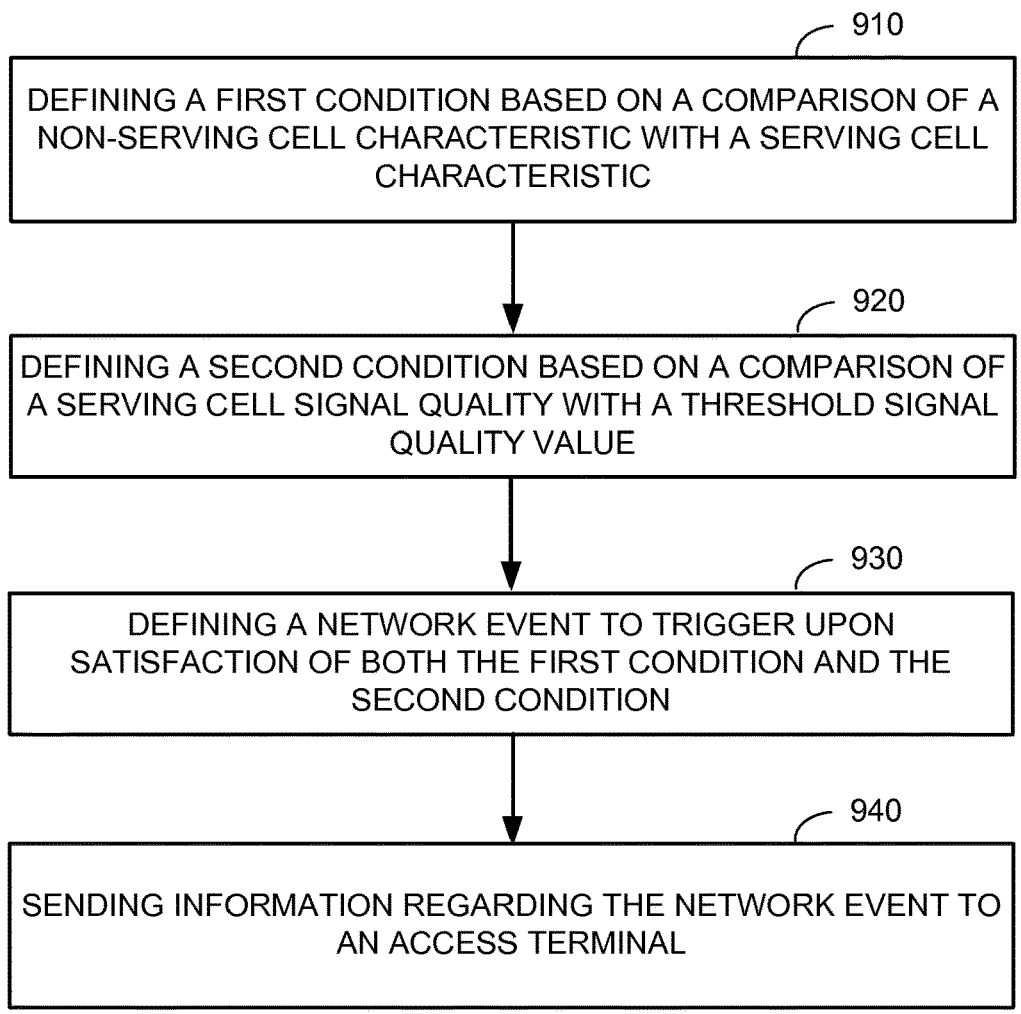
FIG. 9 illustrates a third example of a methodology for configuring network events.

In accordance with one or more aspects of the implementations described herein, with reference to FIG. 9, there is shown a third methodology 900 for configuring network events. The method 900, operable by the network entity or the like or component(s) thereof, may involve, at 910, defining a first condition based on a comparison of a non-serving cell characteristic with a serving cell characteristic. In an example implementation, the network entity may be a femtocell base station as the serving access point 610, as shown in FIG. 6. In a related aspect, the condition defining component 613 of the serving access point 610 may define the first condition. In another related aspect, the comparison of a non-serving cell characteristic with a serving cell characteristic may be a comparison of signal quality.

The method 900 may involve, at 920, defining a second condition based on a comparison of a serving cell signal quality with a threshold signal quality value. For example, the condition defining component 613 of the serving access point 610 may define the second condition, as shown in FIG. 6. In a related aspect, the threshold signal quality value may be predetermined or be determined according to a table or formula.

The method 900 may involve, at 930, defining a network event to trigger upon satisfaction of both the first condition and the second condition. For example, the network event defining component 614 of the serving access point 610 may define the network event, as shown in FIG. 6.

The method 900 may involve, at 940, sending information regarding the network event to an access terminal. For example, the transceiver component 618 of the serving access point 610 may send the information to the access terminal 630, as shown in FIG. 6.

Figure 10:
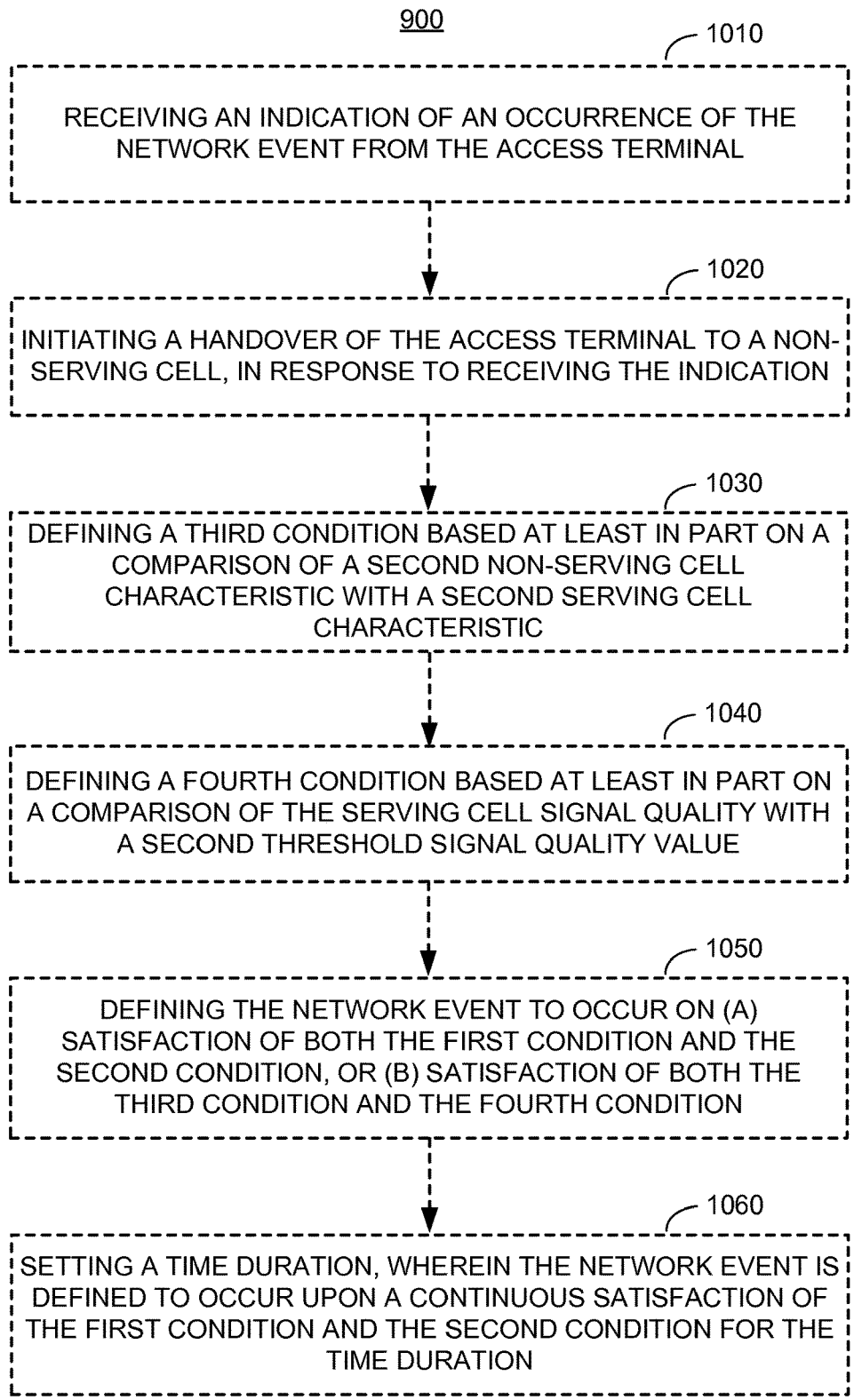
FIG. 10 illustrates further optional aspects of the methodology of FIG. 9.

FIG. 10 illustrates further optional operations or aspects of the method 900 described above with reference to FIG. 9. The method 900 may optionally involve, at 1010, receiving an indication of an occurrence of the network event from the access terminal. For example, the transceiver component 618 of the serving access point 610 may receive the indication of the occurrence of the network event from the access terminal 630, as shown in FIG. 6.

The method 900 may optionally involve, at 1020, initiating a handover of the access terminal to a non-serving cell, in response to receiving the indication. For example, the handover initiating component 616 of the serving access point 610 may initiate the handover of the access terminal 630, as shown in FIG. 6.

The method 900 may optionally involve, at 1030, defining a third condition based at least in part on a comparison of a second non-serving cell characteristic with a second serving cell characteristic. For example, the condition defining component 613 of the serving access point 610 may define the third condition, as shown in FIG. 6.

The method 900 may optionally involve, at 1040, defining a fourth condition based at least in part on a comparison of the serving cell signal quality with a second threshold signal quality value. For example, the condition defining component 613 of the serving access point 610 may define the fourth condition, as shown in FIG. 6.

The method 1000 may optionally involve, at 1050, defining the network event to occur on (a) satisfaction of both the first condition and the second condition, or (b) satisfaction of both the third condition and the fourth condition. For example, the network event defining component 614 of the serving access point 610 may define the network event, as shown in FIG. 6.

The method 900 may optionally involve, at 1060, setting a time duration, wherein the network event is defined to occur upon a continuous satisfaction of the first condition and the second condition for the time duration.

Figure 11:
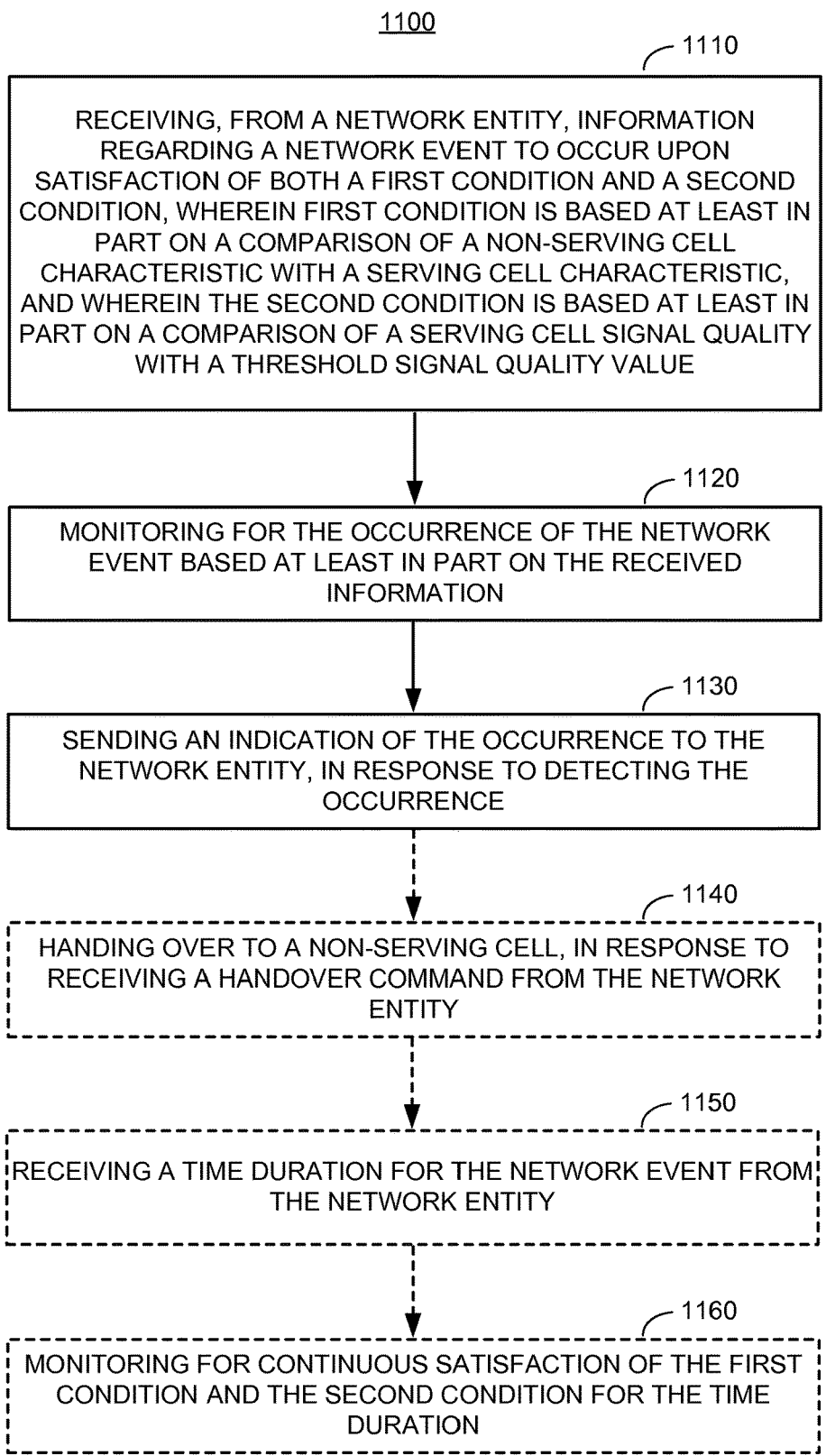
FIG. 11 illustrates a fourth example of a methodology for configuring network events.

In accordance with one or more aspects of the implementations described herein, with reference to FIG. 11, there is shown a fourth methodology 1100 for configuring network events. The method 1100, operable by the network entity or the like or component(s) thereof, may involve, at 1110, receiving, from a network entity, information regarding a network event to occur upon satisfaction of both a first condition and a second condition, wherein first condition is based on a comparison of a non-serving cell characteristic with a serving cell characteristic, and wherein the second condition is based on a comparison of a serving cell signal quality with a threshold signal quality value. For example, the transceiver component 636 of the access terminal 630 may receive the information regarding the network event from the serving access point 610, as shown in FIG. 6.

The method 1100 may involve, at 1120, monitoring for the occurrence of the network event based on the received information. For example, the monitoring component 634 of the access terminal 630 may monitor for the occurrence of the network event, as shown in FIG. 6.

The method 1100 may involve, at 1130, sending an indication of the occurrence to the network entity, in response to detecting the occurrence. For example, the transceiver component 636 of the access terminal 630 may send the indication to the serving access point 610, as shown in FIG. 6.

The method 1100 may optionally involve, at 1140, handing over to a non-serving cell, in response to receiving a handover command from the network entity. For example, the access terminal 630 may handover to a non-serving access point 620, as shown in FIG. 6.

The method 1100 may optionally involve, at 1150, receiving a time duration for the network event from the network entity. The method 1100 may optionally involve, at 1160, monitoring for continuous satisfaction of the first condition and the second condition for the time duration. For example, the monitoring component 634 of the access terminal 630 may monitor for the continuous satisfaction of the first condition and the second condition for the time duration, as shown in FIG. 6.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a non-transitory computer-readable medium. Non-transitory computer-readable media includes both computer storage media and communication media including any medium that facilitates transfer of a computer program from one place to another. A storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein, but is to be accorded the widest scope consistent with the principles and novel features disclosed herein.

What is claimed is:

1. A method of wireless communication operable by a network entity, comprising:
    receiving a first report regarding a serving cell signal quality from an access terminal served by the serving cell, wherein receiving the first report occurs in response to a measurement of the serving cell signal quality meeting a threshold reporting value;
    defining a first set of parameters for a network event, the first set of parameters being based at least in part on the first report, wherein the first set of parameters comprises an event offset parameter, a reporting range parameter, and a frequency offset parameter;
    receiving a second report regarding the serving cell signal quality from the access terminal served by the serving cell;

defining a second set of parameters for the network event, the second set of parameters being based at least in part on the second report, wherein the second set of parameters is different from the first set of parameters;

sending the first set of parameters for the network event to the access terminal; and sending the second set of parameters to the access terminal.

2. The method of claim 1, further comprising:

receiving an indication of an occurrence of the network event from the access terminal; and initiating a handover of the access terminal to a non-serving cell, in response to receiving the indication.

3. The method of claim 1, wherein the network entity comprises a femtocell base station.

4. The method of claim 1, wherein the first set of parameters further comprises a parameter for comparing of the serving cell signal quality with a non-serving cell signal quality.

5. The method of claim 1, wherein the first set of parameters further comprises a hysteresis parameter or a time-to-trigger parameter.

6. The method of claim 1, wherein the first set of parameters further comprises a cell individual offset parameter.

7. The method of claim 1, wherein the first set of parameters is further based on a third report regarding the serving cell signal quality received from a non-serving cell.

8. The method of claim 1, wherein receiving the first report comprises periodically receiving at least one measurement of the serving cell signal quality from the access terminal.

9. A wireless communication apparatus, comprising:

means for receiving a first report regarding a serving cell signal quality from an access terminal served by the serving cell, wherein receiving the first report occurs in response to a measurement of the serving cell signal quality meeting a threshold reporting value;

means for defining a first set of parameters for a network event, the first set of parameters being based at least in part on the first report, wherein the first set of parameters comprises an event offset parameter, a reporting range parameter, and a frequency offset parameter;

means for receiving a second report regarding the serving cell signal quality from the access terminal served by the serving cell;

means for defining a second set of parameters for the network event, the second set of parameters based at least in part on the second report, wherein the second set of parameters is different from the first set of parameters;

means for sending the first set of parameters for the network event to the access terminal; and means for sending the second set of parameters to the access terminal.

10. The apparatus of claim 9, further comprising:

means for receiving an indication of an occurrence of the network event from the access terminal; and means for initiating a handover of the access terminal to a non-serving cell, in response to receiving the indication.

11. The apparatus of claim 9, wherein receiving the first report comprises periodically receiving at least one measurement of the serving cell signal quality from the access terminal.

12. A non-transitory computer-readable medium comprising:

code for causing at least one computer to receive a first report regarding a serving cell signal quality from an access terminal served by the serving cell, wherein receiving the first report occurs in response to a measurement of the serving cell signal quality meeting a threshold reporting value;

code for causing at least one computer to define a first set of parameters for a network event, the first set of parameters being based at least in part on the first report, wherein the first set of parameters comprises an event offset parameter, a reporting range parameter, and a frequency offset parameter;

code for causing at least one computer to receive a second report regarding the serving cell signal quality from the access terminal served by the serving cell;

code for causing at least one computer to define a second set of parameters for the network event, the second set of parameters being based at least in part on the second report, wherein the second set of parameters is different from the first set of parameters;

code for causing at least one computer to send the first set of parameters for the network event to the access terminal; and code for causing at least one computer to send the second set of parameters to the access terminal.

13. A wireless communication apparatus, comprising:

a radio frequency (RF) transceiver configured to:

receive a first report regarding a serving cell signal quality from an access terminal served by the serving cell, wherein receiving the report occurs in response to a measurement of the serving cell signal quality meeting a threshold reporting value; and receive a second report regarding the serving cell signal quality from the access terminal served by the serving cell;

at least one processor configured to:

define a first set of parameters for a network event, the first set of parameters being based at least in part on the first report, wherein the first set of parameters comprises an event offset parameter, a reporting range parameter, and a frequency offset parameter; and define a second set of parameters for the network event, the second set of parameters being based at least in part on the second report, wherein the second set of parameters is different from the first set of parameters;

wherein the RF transceiver is further configured to send the first and second set of parameters for the network event to the access terminal; and a memory coupled to the at least one processor for storing data.

* * * * *